(12) United States Patent
Wu et al.

(10) Patent No.: US 8,754,928 B2
(45) Date of Patent: Jun. 17, 2014

(54) ELECTRONIC APPARATUS WITH PHOTOGRAPHING FUNCTION AND 3D IMAGE FORMING METHOD

(75) Inventors: Wen-Chin Wu, Taipei Hsien (TW); Yao-Tsung Chang, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 771 days.

(21) Appl. No.: 12/585,643

(22) Filed: Sep. 21, 2009

(65) Prior Publication Data

US 2010/0134597 A1   Jun. 3, 2010

(30) Foreign Application Priority Data

Nov. 28, 2008   (TW) .............................. 97146409 A

(51) Int. Cl.
*H04N 13/02* (2006.01)
(52) U.S. Cl.
CPC ................................ *H04N 13/0239* (2013.01)
USPC .... 348/47; 455/556.1; 455/575.1; 455/575.4; 396/325

(58) Field of Classification Search
None
See application file for complete search history.

(56) References Cited

U.S. PATENT DOCUMENTS

| | | | | |
|---|---|---|---|---|
| 6,567,677 B1 * | 5/2003 | Sokoloff | ..................... | 455/575.1 |
| 6,795,715 B1 * | 9/2004 | Kubo et al. | ................. | 455/556.1 |
| 7,155,118 B2 * | 12/2006 | Lee | ................. | 396/429 |
| 7,174,195 B2 * | 2/2007 | Nagamine | .................. | 455/575.1 |
| 7,301,555 B2 * | 11/2007 | Navntoft | .................... | 348/14.02 |
| 7,349,004 B2 * | 3/2008 | Priestman et al. | ......... | 348/14.01 |
| 7,518,641 B2 * | 4/2009 | Mashitani et al. | ......... | 348/231.6 |
| 7,856,180 B2 * | 12/2010 | Chishima | ...................... | 396/324 |
| 7,889,192 B2 * | 2/2011 | Konya et al. | .................. | 345/419 |
| 7,961,234 B2 * | 6/2011 | Viinikanoja et al. | .......... | 348/264 |
| 8,380,257 B2 * | 2/2013 | Jeong et al. | ................ | 455/575.1 |
| 2005/0049019 A1 * | 3/2005 | Lee | ............................ | 455/575.4 |
| 2005/0054397 A1 * | 3/2005 | Kim et al. | ................ | 455/575.4 |
| 2005/0134717 A1 * | 6/2005 | Misawa | ................... | 348/333.06 |
| 2006/0132645 A1 * | 6/2006 | Chang et al. | .................. | 348/376 |
| 2006/0197861 A1 * | 9/2006 | Won et al. | ................ | 348/333.06 |
| 2006/0275031 A1 * | 12/2006 | Ku et al. | ....................... | 396/429 |

(Continued)

FOREIGN PATENT DOCUMENTS

| | | |
|---|---|---|
| CN | 1213784 A | 4/1999 |
| CN | 201039254 Y | 3/2008 |
| CN | 2011 14217 Y | 9/2008 |
| TW | 300398 M | 11/2006 |

OTHER PUBLICATIONS

Office action of corresponding CN application No. 200810182655.X, dated Nov. 18, 2010.

(Continued)

*Primary Examiner* — Greg C Bengzon
(74) *Attorney, Agent, or Firm* — Bacon & Thomas, PLLC

(57) ABSTRACT

An electronic apparatus with photographing function is disclosed. The electronic apparatus comprises a central processing unit, a first lens module, and a second lens module. The first lens module and the second lens module are electronically connected to the central processing unit. The first lens module may obtain a first image of a target, and the second lens module may obtain a second image of the target. There is a viewing angle difference between the first image and the second image. The central processing unit may be activated for processing the first image and the second image to form a 3D image by adjusting the second lens module to an acting position.

11 Claims, 7 Drawing Sheets

(56) References Cited

U.S. PATENT DOCUMENTS

2007/0040924 A1* 2/2007 Cho et al. .................. 348/335
2008/0311963 A1* 12/2008 Strawn ..................... 455/575.1
2009/0042610 A1* 2/2009 Kota et al. ................ 455/556.1
2011/0117958 A1* 5/2011 Kim et al. ................ 455/556.1

OTHER PUBLICATIONS

Office Action issued on Apr. 24, 2012 in corresponding Taiwanese application No. 097146409.

* cited by examiner

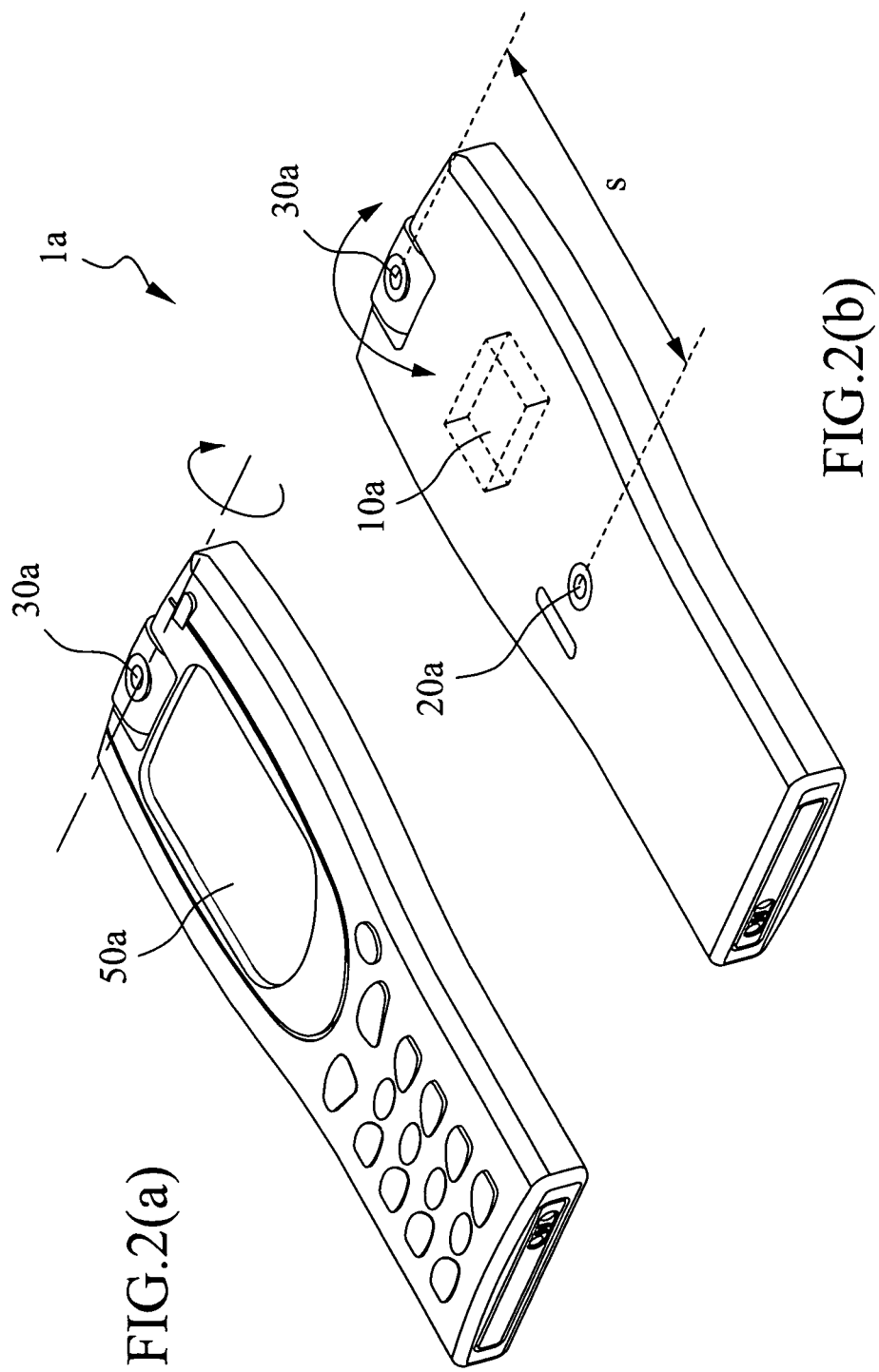

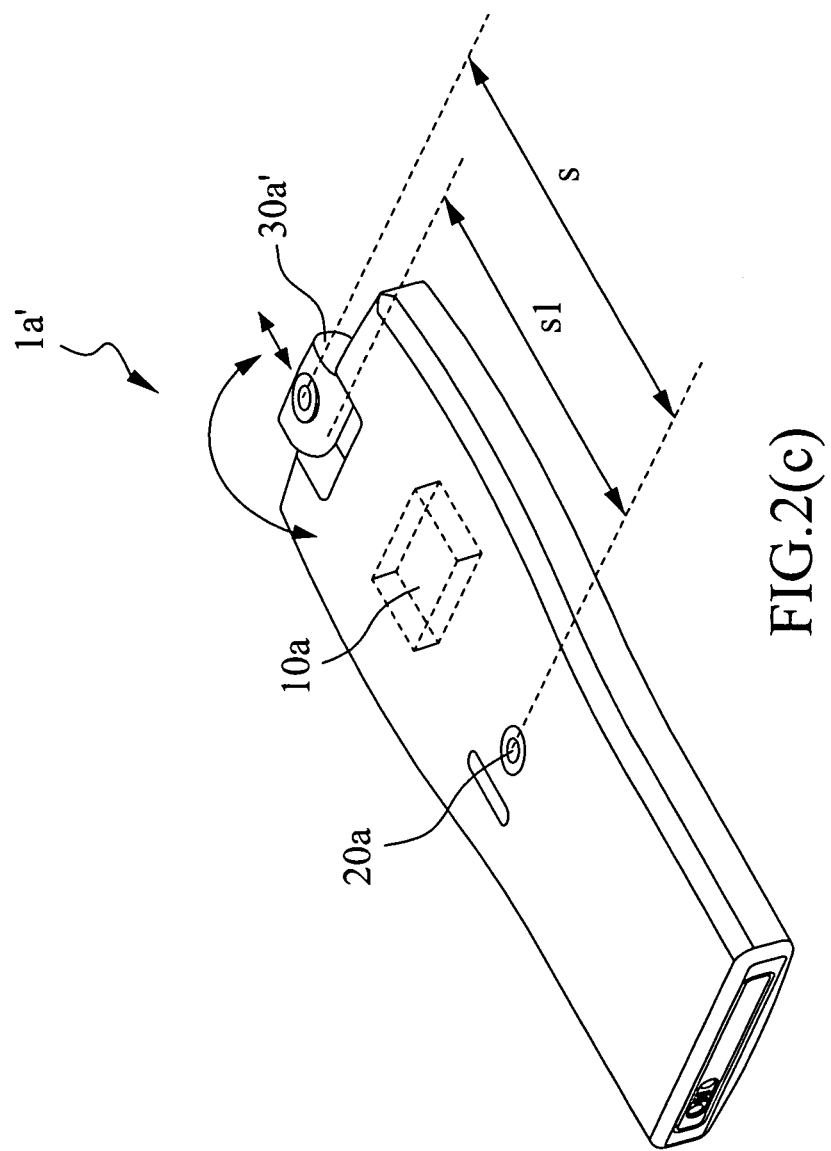

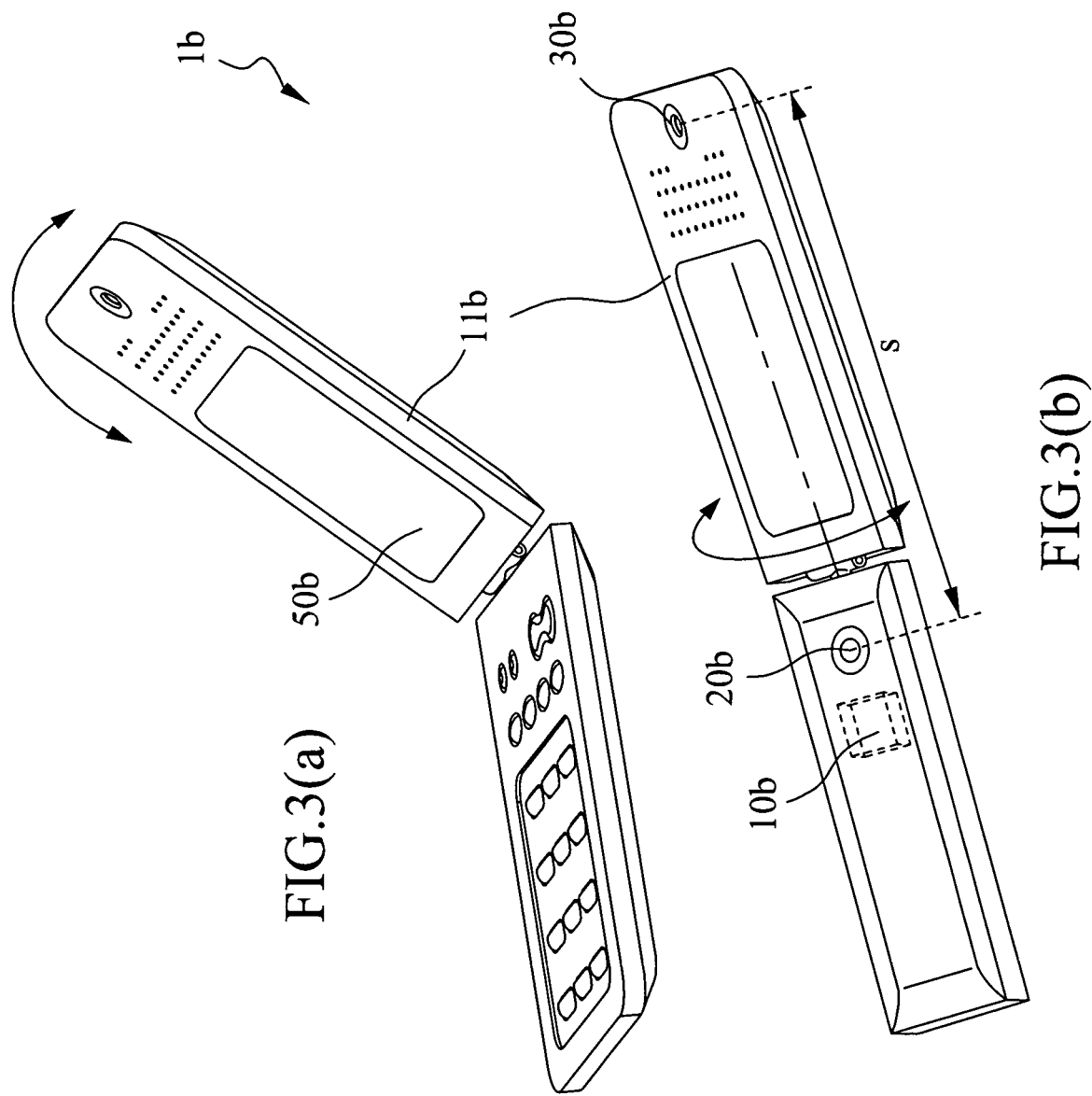

ELECTRONIC APPARATUS WITH PHOTOGRAPHING FUNCTION AND 3D IMAGE FORMING METHOD

BACKGROUND OF THE INVENTION

1. Field of the Invention

The present invention relates to an electronic apparatus with photographing function; more particularly, the present invention relates to an electronic apparatus with photographing function capable of forming 3D images.

2. Description of the Related Art

Recently, with improvements in technology, typical 2D plane display images do not meet demands for high quality visual entertainment; therefore, 3D format images have been developed. For mobile phone applications, the typical 2D plane display module is a well developed technology; currently, many mobile phone manufacturers are developing 3D image display modules. The primary requirement for developing a 3D display module is the generation of 3D format images on the mobile phone. A prior art mobile phone with a 3D image function has an additional lens module next to an original lens module on the back side of the mobile phone, and the two lens modules obtain two images with a viewing angle difference to generate and display a 3D image. However, since most mobile phones have a very limited volume to maintain portability, the two lens modules of the prior art mobile phone might be disposed ono close to each other or be disposed in inappropriate positions; such dispositions may cause the two images obtained to have an insufficient difference in viewing angles or improper viewing angles, which affects the quality and effect of the generated 3D image. Furthermore, the additional lens module reduces the available space in the mobile phone and also increases the manufacturing cost of the mobile phone.

Therefore, there is a need to provide an electronic apparatus with photographing function and a 3D image forming method to mitigate and/or obviate the aforementioned problems.

SUMMARY OF THE INVENTION

A main objective of the present invention is to provide an electronic apparatus with photographing function capable of forming 3D images.

To achieve the aforementioned objective, the electronic apparatus with photographing function of the present invention comprises a central processing unit, a first lens module, and a second lens module. The first lens module and the second lens module are electronically connected to the central processing unit. The first lens module is used for obtaining a first image of a target, and the second lens module is used for obtaining a second image of the target. There is a viewing angle difference between the first image and the second image. By means of adjusting the second lens module to an acting position, the central processing unit may be activated for processing the first image and the second image to form a 3D image. Accordingly, the electronic apparatus of the present invention can utilize two originally arranged lens modules to generate a 3D image without adding any additional lens module, so as to save on the manufacturing cost and available space of a cell phone.

The 3D image forming method of the present invention is applied to the aforementioned electronic apparatus with photographing function. The method comprises the following steps: providing an electronic apparatus with photographing function, wherein the electronic apparatus comprises a first lens module and a second lens module; adjusting the second lens module to an acting position to activate a 3D photographing mode; obtaining a first image and a second image of a target via the first lens module and the second lens module, wherein there is a viewing angle difference between the first image and the second image; and processing the first image and the second image to form a 3D image.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views:

FIGS. 2(a) and 2(b) are illustrations of the electronic apparatus with photographing function according to a first embodiment of the present invention.

FIG. 2(c) is an illustration of the electronic apparatus with photographing function according to a second embodiment of the present invention.

FIGS. 3(a) and 3(b) are illustrations of the electronic apparatus with photographing function according to a third embodiment of the present invention.

DETAILED DESCRIPTION OF THE PREFERRED EMBODIMENT

Figure 1:
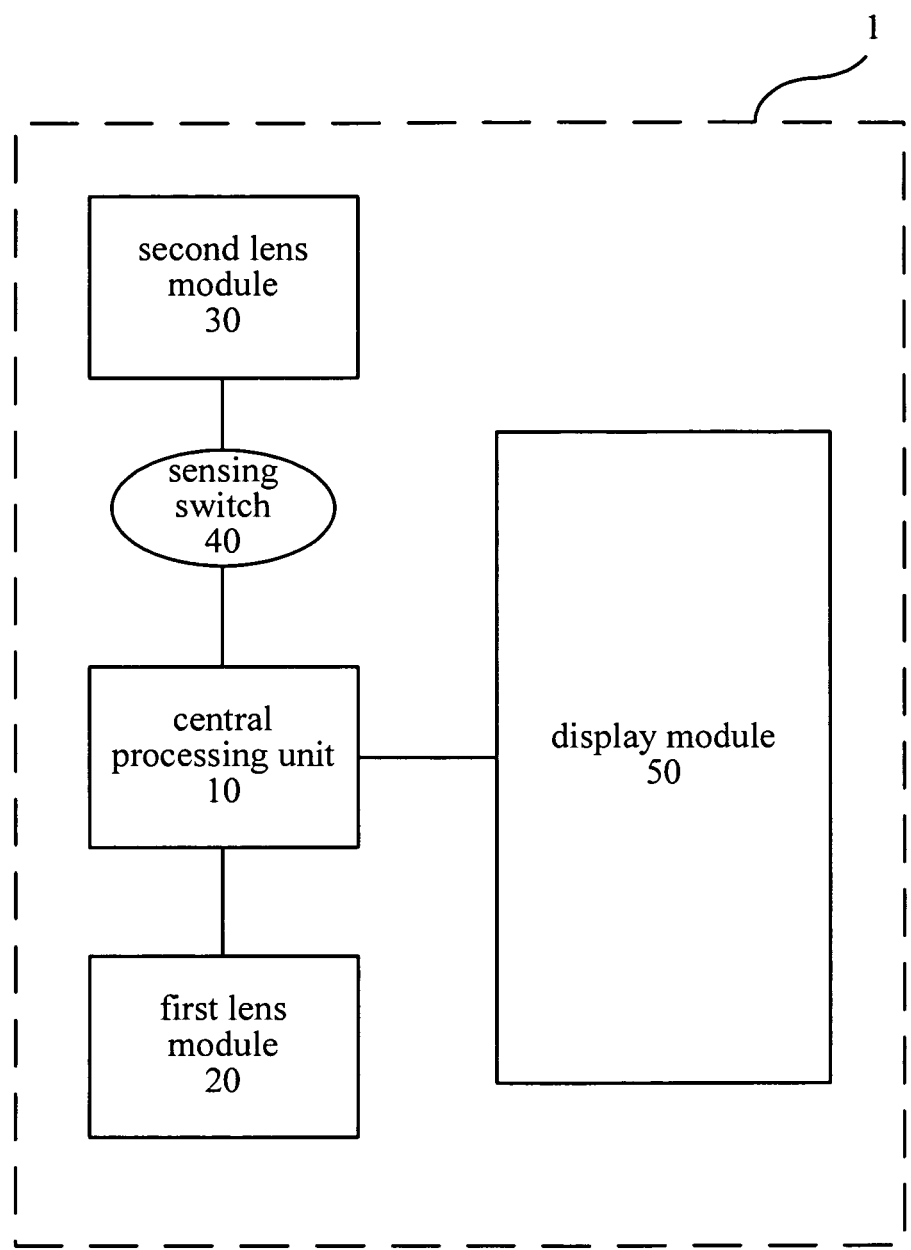
FIG. 1 is a schematic drawing of an electronic apparatus with photographing function of the present invention.

Please refer to FIG. 1, which is a schematic drawing of an electronic apparatus with photographing function of the present invention. As shown in FIG. 1, the electronic apparatus 1 of the present invention comprises a central processing unit 10, a first lens module 20, and a second lens module 30. The first lens module 20 and the second lens module 30 are electronically connected to the central processing unit 10. The first lens module 20 is used for obtaining a first image of a target, and the second lens module 30 is used for obtaining a second image of the target. There is a viewing angle difference between the first image and the second image. A sensing switch 40 can be disposed on the second lens module 30. When the second lens module 30 is adjusted to an acting position, the sensing switch 40 can be triggered to send a control command to the central processing unit 10. After receiving the control command, the central processing unit 10 can be activated to enter a 3D photographing mode. In such 3D photographing mode, when a user uses the electronic apparatus 1 of the present invention to photograph a certain target, a first image of the target can be obtained via the first lens module 20, and a second image of the target can be obtained via the second lens module 30. Because the first lens module 20 and the second lens module 30 are disposed in different positions, there is a viewing angle difference between the first image and the second image. According to a structural design or an internal numerical operation process of the central processing unit 10 of the electronic apparatus 1, the present invention disposes substantially or simulates that the distance between the first lens module 20 and the second lens module 30 is substantially equal to the average distance between a human's eyes. Further, the first lens module 20 and the second lens module 30 face the same direction and are located at the same level. Therefore, the first image and the second image are similar to what is observed through a pair of human eyes. Then the central processing unit 10 processes the obtained first image and the second image to form a 3D image.

Moreover, the electronic apparatus 1 of the present invention further comprises a display module 50. The display module 50 is capable of displaying 3D images. Therefore, the display module 50 can display the 3D image formed by the central processing unit 10. The electronic apparatus 1 of the present invention can be a cell phone or the like, such as a personal digital assistant (PDA), a global positioning system (GPS) apparatus, or a digital camera. Please note that the electronic apparatus 1 of the present invention is not limited to the aforementioned description.

Please refer to FIGS. 2(a) and 2(b), which are illustrations of an electronic apparatus with photographing function according to a first embodiment of the present invention. As shown in FIGS. 2(a) and 2(b), in this embodiment, the electronic apparatus 1a of the present invention is a bar-type cell phone. The bar-type cell phone comprises a first lens module 20a disposed on the back of the cell phone, and a second lens module 30a disposed on the top and the front of the cell phone. Further, the distance s between the first lens module 20a and the second lens module 30a is substantially equal to the average distance between a human's eyes, wherein the second lens module 30a is designed as a rotatable lens module. Under a normal usage status, the first lens module 20a provides a common cell phone photographing function, and the second lens module 30a provides a video signal transmission function acting like a video phone.

As shown in FIG. 2(b), when the user rotates the second lens module 30a to an acting position, such that the second lens module 30a faces the same direction as that of the first lens module 20a, the central processing unit 10a in the cell phone may be activated. Therefore, the electronic apparatus 1a then enters the 3D photographing mode. Because the first lens module 20a and the second lens module 30a are located at the same level, images obtained under such arrangement are much more similar to images observed with human eyes. As a result, the user can utilize the electronic apparatus 1a to form the 3D image, and utilize the display module 50a to display the 3D image. On the other hand, when the user rotates the second lens module 30a to depart from the acting position, the electronic apparatus 1a then leaves the 3D photographing mode and returns to its original usage mode. Please note that the way or structure of assembling the second lens module 30a to the main body of the cell pone for adjusting the second lens module 30a is not limited to the above-mentioned description.

Please refer to FIG. 2(c), which is an illustration of the electronic apparatus with photographing function according to a second embodiment of the present invention. The second embodiment is slightly different from the first embodiment. As shown in FIG. 2(c), in this embodiment, the electronic apparatus 1a' is also a bar-type cell phone. However, due to a structural design difference, the distance s1 between the first lens module 20a and the second lens module 30a' is smaller than the average distance between a human's eyes. The second lens module 30a' is designed as a rotatable and shiftable lens module. When the user wants to activate the 3D photographing mode, the user can rotate and shift the second lens module 30a' to an acting position. When the second lens module 30a' is adjusted to the acting position, the distance s between the first lens module 20a and the second lens module 30a' is substantially equal to the average distance between a human's eyes, so as to obtain a better first image and second image for further processing.

Please refer to FIGS. 3(a) and 3(b), which are illustrations of the electronic apparatus with photographing function according to a third embodiment of the present invention. As shown in FIGS. 3(a) and 3(b), the electronic apparatus 1b of the present invention also comprises the first lens module 20b and the second lens module 30b, wherein the distance s between the first lens module 20b and the second lens module 30b is substantially equal to the average distance between a human's eyes. The second lens module 30b is disposed on a rotatable member 11b, and the second lens module 30b can be adjusted to the acting position by means of rotating the rotatable member 11b. In this embodiment, the electronic apparatus 1b of the present invention is a flip cell phone, and the rotatable member 11b is an upper lid of the flip cell phone. As show in FIG. 3(b), when the user rotates the upper lid of the flip cell phone to an acting position, the second lens module 30b comes to face the same direction as that of the first lens module 20b. At this time, the central processing unit 10b installed in the cell phone can be activated, so as to enter the 3D photographing mode. Under the 3D photographing mode, the first lens module 20b and the second lens module 30b are located at the same level. On the other hand, when the user rotates the upper lid to depart from the acting position, the electronic apparatus 1b then returns to its original usage mode.

Figure 3C:
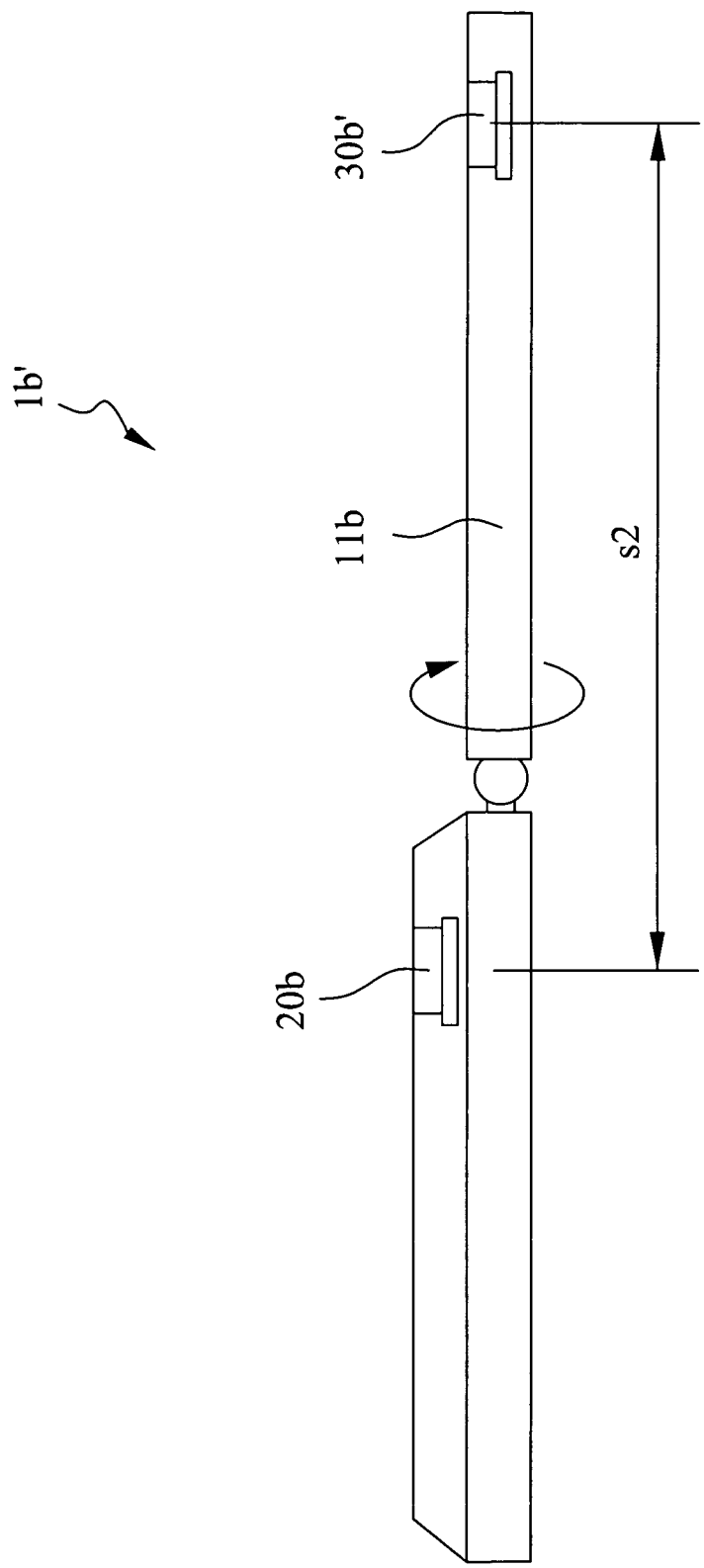
FIG. 3(c) is an illustration of the electronic apparatus with photographing function according to a fourth embodiment of the present invention.

Please refer to FIG. 3(c), which is an illustration of the electronic apparatus with photographing function according to a fourth embodiment of the present invention. The fourth embodiment is slightly different from the third embodiment. As shown in FIG. 3(c), in this embodiment, the electronic apparatus 1b' is also a flip cell phone. When the second lens module 30b' is adjusted to the acting position by means of rotating the rotatable member 11b', the distance s2 between the first lens module 20b and the second lens module 30b' is smaller than the average distance between a human's eyes due to a structural design difference. The structural design difference is that the first lens module 20b and the second lens module 30b' are not located at the same level, even though they face the same direction. As a result, the quality of the 3D image would be affected. Under such circumstances, the electronic apparatus 1b' of the present invention can utilize the central processing unit to perform coordinate conversion to the obtained first image and the second image, so as to simulate that the first lens module 20b and the second lens module 30b' are located at the same level, and to simulate that the distance between the first lens module 20b and the second lens module 30b' is substantially equal to the average distance between a human's eyes, thereby optimizing the forming effect of the 3D image.

Figure 3D:
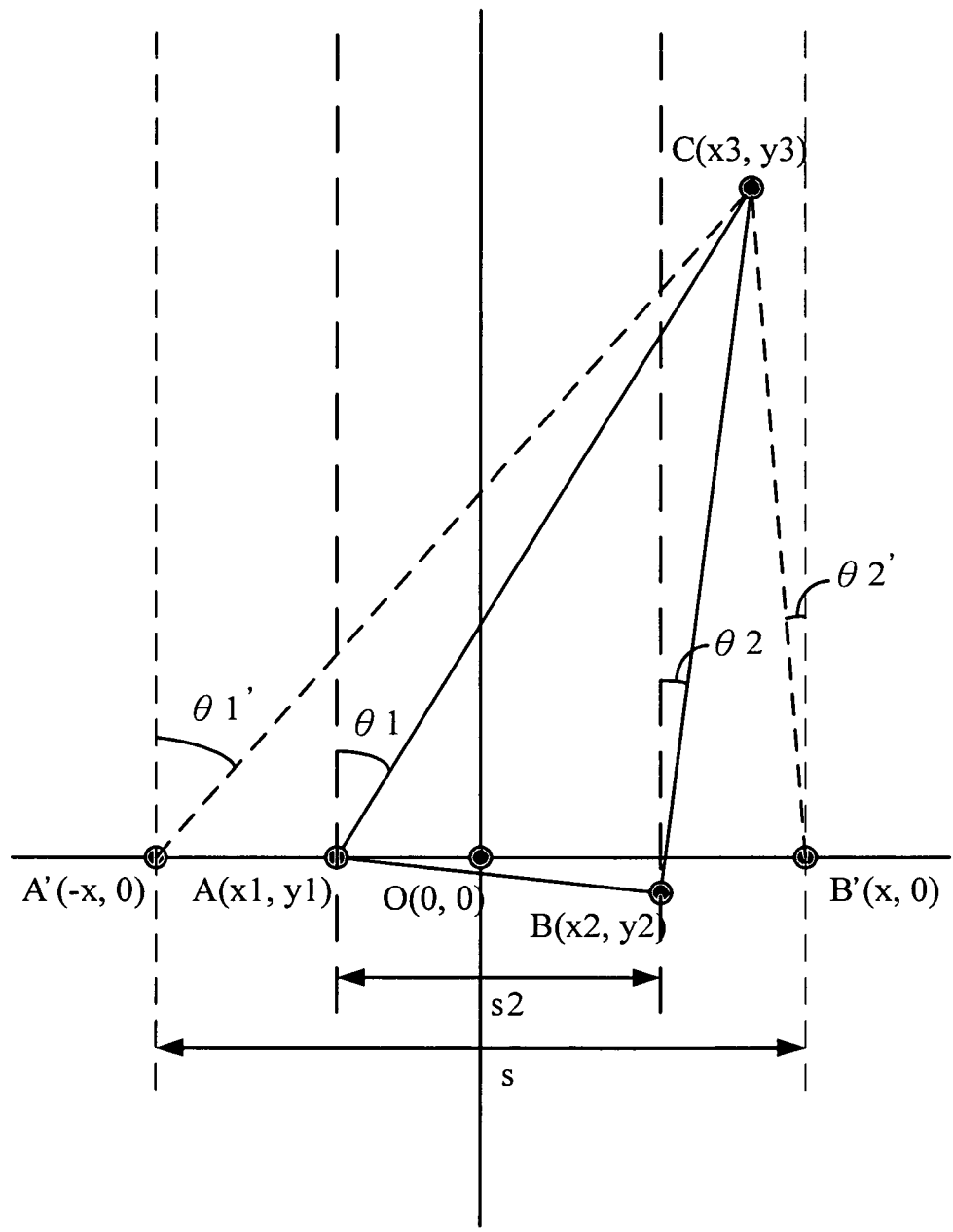
FIG. 3(d) is a schematic drawing illustrating a spatial coordinate of the electronic apparatus with photographing function according to the fourth embodiment of the present invention.

Please refer to FIG. 3(d), which is a schematic drawing illustrating a spatial coordinate of the electronic apparatus with photographing function 1b' according to the fourth embodiment of the present invention. As shown in FIGS. 3(c) and 3(d), in the electronic apparatus 1b' of the present invention, because the positions of the first lens module 20b and the second lens module 30b' when adjusted to the acting position are fixed, the coordinates of the first lens module 20b and the second lens module 30b' can be calculated in advance. The present invention assumes that the coordinate of the first lens module 20b is A(x1,y1), the coordinate of the second lens module 30b' is B(x2,y2), and the distance in x-axis between the first lens module 20b and the second lens module 30b' is s2 (i.e. x1+x2). Wherein the coordinate positions x1, x2, y1 and y2 are known values. Further, the present invention assumes that the coordinates of the simulated first lens module 20b and the second lens module 30b' are A'(−x,0) and B'(x,0), wherein the distance s (i.e. 2×) between the first lens module 20b and the second lens module 30b' corresponds to the average distance between a human's eyes, and x is a known value. In this embodiment, please note that the present invention assumes that the lens modules are disposed on an x-axis which passes through the origin (0,0); therefore the y-axis coordinates of A' and B' are 0.

The present invention also assumes that the coordinate of a target is C(x3,y3). When photographing the target, an included angle θ1 is formed between a line of sight from the first lens module 20b to the target and a vertical line passing through the first lens module 20b, and another included angle θ2 is formed between a line of sight from the second lens module 30b' to the target and a vertical line passing through the second lens module 30b'. The values of the included angles θ1 and θ2 can be calculated by the electronic apparatus 1b' of the present invention. Because points A, B, and C form a triangle, with the values of A(x1,y1), B(x2,y2), θ1 and θ2 already known, the values of x3 and y3 can be calculated according to coordinate conversion. Therefore, the coordinate of the target C(x3,y3) can be obtained. When the coordinate of C(x3,y3) is confirmed, relative positions among A'(−x,0), B'(x,0) and C(x3,y3) can be calculated. Also, an included angle θ1' formed between a line of sight from A' to C and a vertical line passing through A', and an included angle θ2' formed between a line of sight from B' to C and a vertical line passing through B' can be obtained. Therefore, by means of performing coordinate conversion to the first image and the second image obtained by the first lens module 20b and the second lens module 30b' (i.e., points A and B), the present invention can obtain a new first image and a new second image of the target C by simulating that the first new image and the second image are obtained from points A' and B', so as to form a better 3D image of the target C. Accordingly, whether the first lens module 20b and the second lens module 30b' of the electronic apparatus 1b' are located at the same level or face the same direction does not affect the quality of the generated 3D image, for as long as the first lens module 20b and the second lens module 30b' can both photograph the target, the present invention can always form the 3D image by simulating the status of the target observed by a pair of human eyes according to the known coordinates A(x1,y1), B(x2,y2), A'(−x,0) and B'(x,0) and the measured included angles θ1 and θ2.

Figure 4:
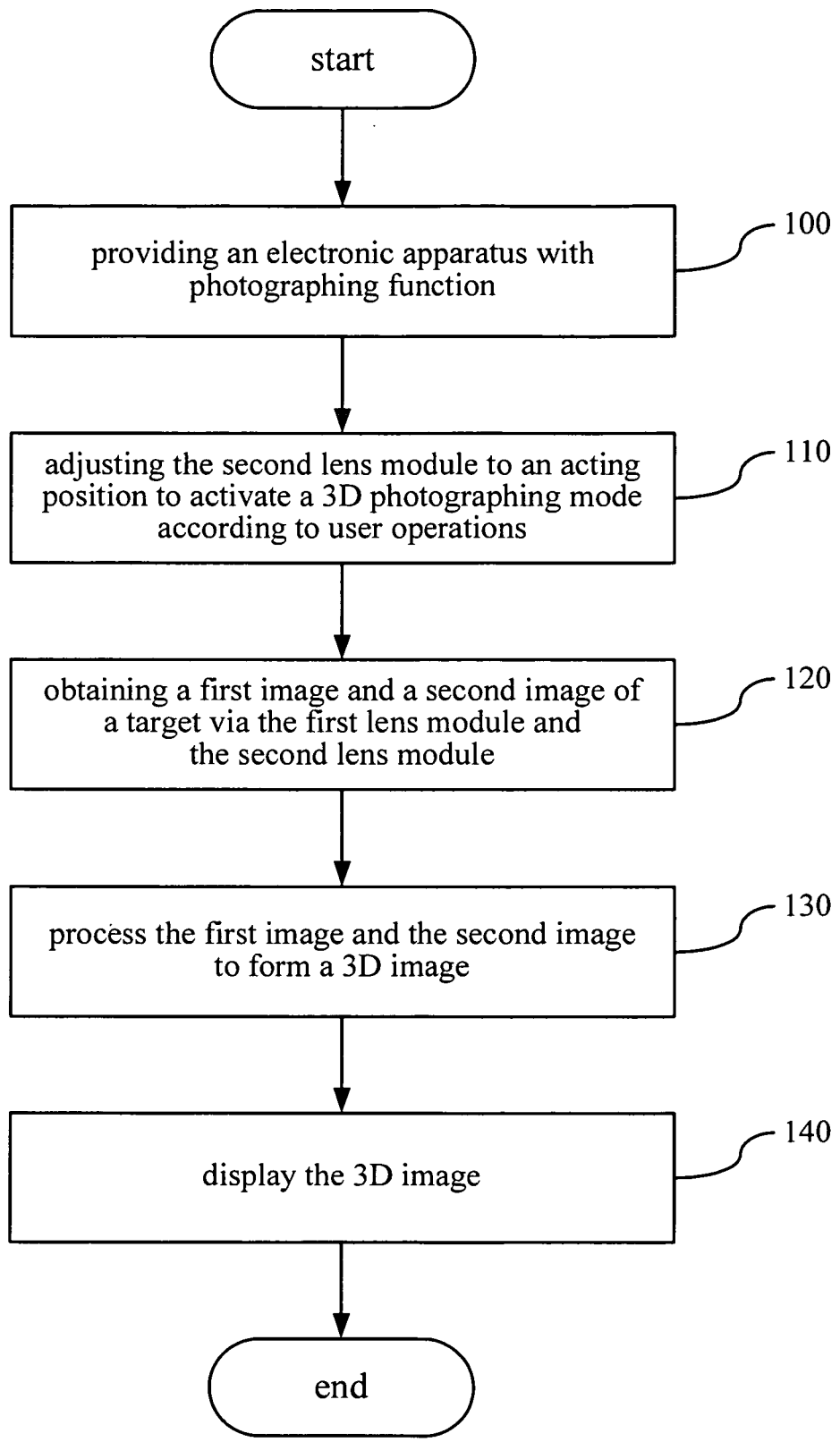
FIG. 4 is a flowchart of a 3D image forming method of the present invention.

Please refer to FIG. 4, which is a flowchart of a 3D image forming method of the present invention. This flowchart is explained based on the electronic apparatus with photographing function 1 as shown in FIG. 1. However, please note that the procedure of this flowchart is not limited to application to the electronic apparatus with photographing function 1. The 3D image forming method of the present invention can also be applied to any other similar electronic apparatus with photographing function. As shown in FIG. 4, the 3D image forming method of the present invention comprises steps 100 to 140. Each step of the 3D image forming method of the present invention will be hereinafter described in detail.

First, Step 100: providing an electronic apparatus with photographing function 1; the electronic apparatus 1 comprises a first lens module 20 and a second lens module 30. As shown in FIG. 1, the 3D image forming method of the present invention is applied to the aforementioned electronic apparatus with photographing function 1. The electronic apparatus 1 comprises the first lens module 20 and the second lens module respectively used for obtaining images. Because of different designs, the distance between the first lens module 20 and the second lens module 30 is approximately equal to the average distance between a human's eyes.

Step 110: adjusting the second lens module 30 to an acting position to activate a 3D photographing mode according to user operations. As shown in FIG. 1, a sensing switch 40 can be triggered by adjusting the second lens module 30 to an acting position. At this time, a control command can be sent to a central processing unit 10 from the sensing switch 40, so as to enter a 3D photographing mode. When the second lens module 30 is adjusted to the aforementioned acting position, the first lens module 20 and the second lens module 30 face the same direction, and the first lens module 20 and the second lens module 30 are located at the same level.

Step 120: obtaining a first image and a second image of a target via the first lens module 20 and the second lens module 30, wherein there is a viewing angle difference between the first image and the second image. After activating the 3D photographing mode in the aforementioned step 110, the electronic apparatus 1 can utilize a photographing function to obtain a first image of a target via the first lens module 20, and to obtain a second image of the target via the second lens module 30. Because the two lens modules are disposed in different positions, there is a viewing angle difference between the first image and the second image.

Step 130: processing the first image and the second image to form a 3D image. When the distance between the first lens module 20 and the second lens module 30 is approximately equal to the average distance between a human's eyes, and the two lens modules face the same direction and are located at the same level, the central processing unit 10 can process the first image and the second image obtained in the aforementioned step 120, so as to form the 3D image. When the distance between the first lens module 20 and the second lens module 30 is not equal to the average distance between a human's eyes, and regardless of whether the two lens modules face the same direction or are located at the same level, the central processing unit 10 can perform coordinate conversion to the first image and the second image obtained in the aforementioned step 120, so as to simulate that the first lens module 20 and the second lens module 30 are located at the same level as well as that the first lens module 20 and the second lens module 30 face the same direction, thereby simulating that the distance between the first lens module 20 and the second lens module 30 is substantially equal to the average distance between a human's eyes. Then the present invention processes the two simulated images to form the 3D image.

Finally, Step 140: displaying the 3D image. After the 3D image is formed in the aforementioned step 130, the electronic apparatus 1 can display the 3D image via a display module 50 capable of displaying 3D images.

Accordingly, the 3D image forming method of the present invention can obtain or simulate two images of a target similar to what is observed by a pair of human eyes via the two lens modules disposed on the electronic apparatus, so as to form a better 3D image after processing.

Although the present invention has been explained in relation to its preferred embodiments, it is to be understood that many other possible modifications and variations can be made without departing from the spirit and scope of the invention as hereinafter claimed.

What is claimed is:

1. An electronic apparatus with photographing function, comprising:
   a central processing unit;
   a first lens module, used for obtaining a first image of a target, wherein the first lens module is electronically connected to the central processing unit; and
   a second lens module, used for obtaining a second image of the target, wherein the second lens module is electronically connected to the central processing unit, and there is a viewing angle difference between the first image and the second image; the first image and the second image are obtained by the first lens module and the second lens module respectively located at different levels; wherein the second lens module is shiftable along a level for adjusting a distance between the first lens module and the second lens module; wherein the second lens module is pulled away from the body of the electronic apparatus;
   where by means of adjusting the second lens module to an acting position, the central processing unit may be activated for processing the first image and the second image to form a 3D image; wherein the central processing unit calculates a coordinate of the target according to included angles respectively corresponded to the target and coordinates of the first lens module and the second lens module; wherein the coordinates of the first lens module and the second lens module are calculated in advanced;
   wherein by means of processing the first image and the second image, the central processing unit simulates that the first image and the second image are obtained when the first lens module and the second lens module are located at the same level, and that the distance between the first lens module and the second lens module is substantially equal to the average distance between a human's eyes;
   wherein the central processing unit performs coordinate conversion for the first image and the second image via the coordinate of the target and the simulative coordinates of the first lens module and the second lens module to simulate the first image and the second image obtained by lens modules located at the same level to form a 3D image.

2. The electronic apparatus as claimed in claim 1, wherein the second lens module is disposed on a rotatable member, where the second lens module can be driven to be adjusted to the acting position by means of rotating the rotatable member.

3. The electronic apparatus as claimed in claim 2, wherein the rotatable member is an upper lid of the electronic apparatus.

4. The electronic apparatus as claimed in claim 1, wherein by means of performing coordinate conversion to the first image and the second image, the central processing unit simulates that the first image and the second image are obtained when the first lens module and the second lens module are located at the same level, and the distance between the first lens module and the second lens module is substantially equal to the average distance between a human's eyes.

5. The electronic apparatus as claimed in claim 4, wherein the second lens module is disposed on a rotatable member, where the second lens module can be adjusted to the acting position by means of rotating the rotatable member.

6. The electronic apparatus as claimed in claim 5, wherein the rotatable member is an upper lid of the electronic apparatus.

7. The electronic apparatus as claimed in claim 1 further comprising a display module capable of displaying the 3D image.

8. A 3D image forming method, comprising the following steps:
   providing an electronic apparatus with photographing function, wherein the electronic apparatus comprises a first lens module and a second lens module; wherein the second lens module is shiftable along a level for adjusting a distance between the first lens module and the second lens module; wherein the second lens module is pulled away from the body of the electronic apparatus;
   adjusting the second lens module to an acting position to activate a 3D photographing mode according to user operations;
   obtaining a first image and a second image of a target via the first lens module and the second lens module, wherein there is a viewing angle difference between the first image and the second image, and the first image and the second image are obtained by the first lens module and the second lens module respectively located at different levels;
   calculating a coordinate of the target according to included angles respectively corresponded to the target and coordinates of the first lens module and the second lens module; wherein the coordinates of the first lens module and the second lens module are calculated in advanced;
   simulating the first image module and the second image module located at the same level and obtaining simulative coordinates of the first image module and the second image module, wherein the distance between the first image module and the second image module is substantially equal to the average distance between a human's eyes; and
   performing coordinate conversion for the first image and the second image via the coordinate of the target and the simulative coordinates of the first lens module and the second lens module to simulate the first image and the second image obtained by lens modules located at the same level to form a 3D image; and
   processing the first image and the second image to form the 3D image by simulating that the first image and the second image are obtained when the first lens module and the second lens module are located at the same level, and that the distance between the first lens module and the second lens module is substantially equal to the average distance between a human's eyes.

9. The method as claimed in claim 8, wherein the second lens module is disposed on a rotatable member, where the second lens module can be adjusted to the acting position by means of rotating the rotatable member.

10. The method as claimed in claim 8 further comprising the following step:
    displaying the 3D image.

11. A 3D image forming method for an electronic apparatus with photographing function, the electronic apparatus comprises a first lens module and a second lens module, wherein the second lens module is shiftable along a level substantially parallel to the for adjusting a distance between the first lens module and the second lens module, wherein the second lens module is pulled away from the body of the electronic apparatus; and wherein the first lens module and the second lens module are respectively located at different levels, the method comprising the following steps:

obtaining a first image and a second image of a target via the first lens module and the second lens module, wherein there is a viewing angle difference between the first image and the second image, and the first image and the second image are obtained by the first lens module and the second lens module respectively located at different levels;

calculating a coordinate of the target according to included angles respectively corresponded to the target and coordinates of the first lens module and the second lens module; wherein the coordinates of the first lens module and the second lens module are calculated in advanced;

simulating the first image module and the second image module located at the same level and obtaining simulative coordinates of the first image module and the second image module, wherein the distance between the first image module and the second image module is substantially equal to the average distance between a human's eyes; and performing coordinate conversion for the first image and the second image via the coordinate of the target and the simulative coordinates of the first lens module and the second lens module to simulate the first image and the second image obtained by lens modules located at the same level to form a 3D image.

* * * * *